(12) United States Patent
Forte et al.

(10) Patent No.: US 11,014,594 B2
(45) Date of Patent: May 25, 2021

(54) STEERING COLUMN FOR A MOTOR VEHICLE

(71) Applicants: THYSSENKRUPP PRESTA AG, Eschen (LI); thyssenkrupp AG, Essen (DE)

(72) Inventors: Sebastian Forte, Mauren (LI); Robert Galehr, Schaanwald (LI)

(73) Assignees: thyssenkrupp Presta AG, Eschen (LI); thyssenkrupp AG, Essen (DE)

(*) Notice: Subject to any disclaimer, the term of this patent is extended or adjusted under 35 U.S.C. 154(b) by 16 days.

(21) Appl. No.: 16/618,551

(22) PCT Filed: Jun. 6, 2018

(86) PCT No.: PCT/EP2018/064898
§ 371 (c)(1),
(2) Date: Dec. 2, 2019

(87) PCT Pub. No.: WO2018/224549
PCT Pub. Date: Dec. 13, 2018

(65) Prior Publication Data
US 2020/0086908 A1    Mar. 19, 2020

(30) Foreign Application Priority Data

Jun. 8, 2017  (DE) ............. 10 2017 209 664.0

(51) Int. Cl.
*B62D 1/16*    (2006.01)
*B62D 5/00*    (2006.01)
*B62D 1/185*   (2006.01)

(52) U.S. Cl.
CPC ............. *B62D 1/166* (2013.01); *B62D 5/001* (2013.01); *B62D 1/185* (2013.01)

(58) Field of Classification Search
CPC .......... B62D 1/166; B62D 1/185; B62D 1/16; B62D 5/001; B62D 5/005; B60R 16/027
See application file for complete search history.

(56) References Cited

U.S. PATENT DOCUMENTS

| 1,019,115 A * | 3/1912 | Adt ..................... G02C 5/12 351/74 |
| 2003/0184072 A1 | 10/2003 | Andonian |
| 2018/0229759 A1 | 8/2018 | Markfort |

FOREIGN PATENT DOCUMENTS

| DE | 100 51 187 A | 1/2002 |
| DE | 101 59 330 A | 7/2002 |
| DE | 103 12 516 A | 10/2003 |

(Continued)

OTHER PUBLICATIONS

English Translation of International Search Report issued in PCT/EP2018/064898, dated Aug. 20, 2018 (dated Aug. 31, 2018).

*Primary Examiner* — Paul N Dickson
*Assistant Examiner* — Scott F. Underwood
(74) *Attorney, Agent, or Firm* — thyssenkrupp North America, LLC

(57) ABSTRACT

A steering column for a motor vehicle includes a steering shaft, mounted rotatably about a longitudinal axis in a steering column housing, and a rotation limiter, and has a smooth and quiet construction of the rotation limiter. The rotation limiter includes two oppositely directed flat spiral springs, which are operatively arranged between a coupling part, disposed in a rotationally secure manner on the steering shaft, and the steering column housing.

20 Claims, 4 Drawing Sheets

(56) References Cited

FOREIGN PATENT DOCUMENTS

| | | |
|---|---|---|
| DE | 10 2013 014 137 B | 10/2014 |
| DE | 10 2014 222 805 A | 5/2016 |
| WO | 2008/120231 A | 10/2008 |
| WO | WO-2008120231 A2 * 10/2008 | ............... B62D 1/16 |
| WO | 2016/071270 A | 5/2016 |
| WO | WO-2016071270 A1 * 5/2016 | ............. B62D 5/005 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2018/064898, filed Jun. 6, 2018, which claims priority to German Patent Application No. DE 10 2017 209 664.0, filed Jun. 8, 2017, the entire contents of both of which are incorporated herein by reference.

FIELD

The present disclosure generally relates to a steering column for a motor vehicle.

BACKGROUND

Steer-by-wire steering columns are distinguished by the fact that no mechanical connections exist between the steering wheel and the steerable wheels. In order to limit the steering rotation, yet also without mechanical connection between the steering wheel and the steerable wheels, it is necessary for a stop to be provided in the direction of rotation, which stop limits the rotation of the steering wheel. It is here customary for more than one rotation of the steering wheel to be necessary in order to steer from stop to stop.

DE 103 12 516 A1 discloses a steering column with rotation limitation, wherein two disks are provided with respectively one spiral track and a ball is arranged between the spiral tracks. Upon the rotation of the steering shaft, the ball shifts in the spiral tracks. This known solution has the drawback of a high tolerance susceptibility, since tolerances result in the balls rattling in the spiral tracks and being able to get stuck.

Thus a need exists for a steering column with rotation limiting mechanism, which ensures a reliable operation and has a low rattling tendency.

DETAILED DESCRIPTION

Figure 1:
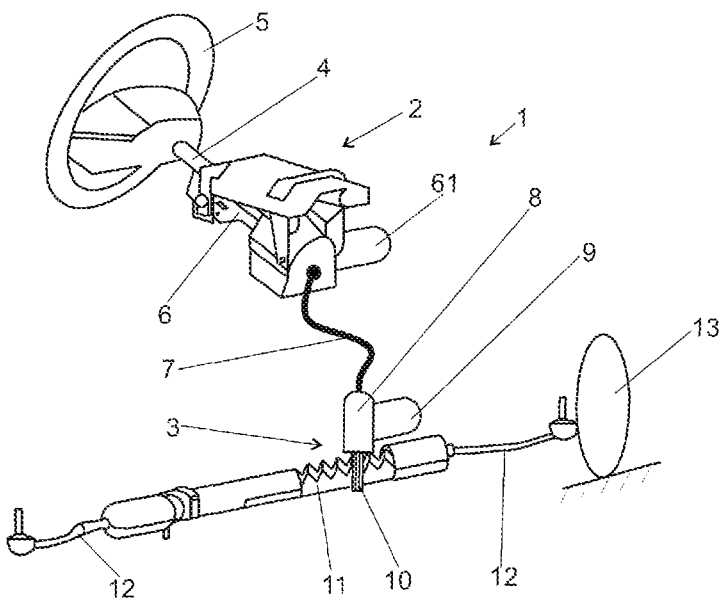
FIG. 1 perspective view of a steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column for a motor vehicle, comprising a steering shaft, mounted rotatably about a longitudinal axis in a steering column housing, and a rotation limiter.

In the steering column according to the invention, the rotation limiter comprises two oppositely directed flat spiral springs, which are operatively arranged between a coupling part, disposed in a rotationally secure manner on the steering shaft, and the steering column housing. In other words, the rotation limiter has a first flat spiral spring and a second flat spiral spring oppositely directed to the first flat spiral spring, wherein the first flat spiral spring is operatively arranged between a coupling part, disposed in a rotationally secure manner on the steering shaft, and the steering column, and the second flat spiral spring is operatively arranged between the coupling part, disposed in a rotationally secure manner on the steering shaft, and the steering column housing. If the driver turns the steering shaft, then the coupling part turns in the same direction and, in so doing, winds up one of the two flat spiral springs until its coils lie firmly one upon the other and the flat spiral spring becomes solidly compressed. The further loading of the flat spiral spring in the same direction of rotation is then realized by traction, whereby a further rotation of the steering shaft is prevented. Thus the maximum steering angle is limited. In exactly the same way, the rotation limiter functions in the opposite direction of rotation with the difference that now the other flat spiral spring is wound up until it becomes solidly compressed and prevents a further rotation in the opposite direction of rotation.

In an advantageous embodiment of the invention, it is provided that the coupling part comprises an outer cylindrical coupling portion, which is coaxial with the steering shaft and on which the two oppositely directed flat spiral springs are arranged side by side in the axial direction, and that respectively an inner end of the flat spiral springs is fastened to the coupling portion. The outer cylindrical surface of the coupling portion is adapted to the round shape and the diameter of the flat spiral springs. The circumference of the cylindrical coupling portion here determines the distance which is covered by that inner end of the respective flat spiral spring that is fastened to the coupling portion in relation to the angle of rotation of the steering shaft, and the countertorque which at the respective stop is maximally available to the flat spiral springs and stops the rotation.

In an advantageous and simple embodiment of the invention, the coupling portion is provided with a slot-shaped aperture, in which respectively a bent-over inner end of the flat spiral springs engages. Through these simple measures, a secure fastening of the flat spiral springs on the coupling portion can be ensured, which fastening is also capable of applying the countertorque necessary for the rotational limitation.

In another advantageous embodiment, the coupling part comprises a sleeve-shaped inner shaft portion, which can be slipped axially onto the steering shaft and which, on its inner side facing the steering shaft, comprises a profile complementary to an outer profile of the steering shaft. In order to connect the coupling part in a torque-locking manner to the steering shaft and to apply the countertorques which are necessary to limit the rotary motion, the steering shaft can be provided with a non-rotationally symmetric outer profile, to which the complementary inner profile of the inner shaft portion of the coupling part is adapted. Alternatively or additionally, a non-positive or substance-to-substance connection between the steering shaft and the coupling part can also be conceivable and possible.

Advantageously, the rotation limiter is arranged in an end region, facing the vehicle front, of the steering column. Here the rotation limiter is easily accessible and can be mounted and maintained in a particularly simple manner.

A further advantageous embodiment in the invention provides that the outer ends of the flat spiral springs are fastened by means of screws to a cap part, which, for its part, is fixedly connected to a mounting flange, disposed in the end region, of the steering column. The coupling part with the two flat spiral springs can therefore be premounted in the cap part in that the two flat spiral springs are firstly arranged on the coupling part and are afterward screwed to the cap part by means of the screws. The thus premounted rotation limiter can then be attached in its entirety in a simple manner to the steering column in that the shaft portion of the coupling part is slipped over the steering shaft and the cap part is connected to the mounting flange of the steering column.

In a preferred embodiment, the flat spiral springs are dimensioned in terms of their length such that they respectively allow a steering wheel turning angle within the range between 360° and 720° to the right and left. This means that a steering wheel turning angle, starting from the central position, i.e. the straight-ahead position of the steering shaft, is permitted to the left within the range between 360° and 720° by the length of one flat spiral spring, and to the right within the range between 360° and 720° by the length of the other flat spiral springs.

In a particularly preferred embodiment of the invention, the flat spiral springs are dimensioned in terms of their length such that they respectively allow a steering wheel turning angle of 540° to the right and left. This steering wheel turning angle corresponds to that of a traditional directly mechanically acting steering column.

Preferably, the flat spiral springs exhibit an, at least in some sections, linear spring characteristic. As a result, an improved steering feel can be provided.

Preferably, the flat spiral springs exhibit an identical spring characteristic. It can thereby be achieved that a steering turning angle exhibits in one direction the same force curve/torque curve as the steering turning angle in the direction opposite to the one direction. Thus a compensation between the first flat spiral spring and the second flat spiral spring can take place when one of the flat spiral springs is wound up and the other flat spiral spring is unwound, so that an equal resistance during steering is perceived or, in other words, the steering torque is constant. In order to improve the behavior of the flat spiral springs in the wind-up and unwinding process, the person skilled in the art can employ measures which are known from turntable units for gramophones (mechanically driven sound carrier reproducing devices).

FIG. 1 shows a steer-by-wire steering system 1 for a motor vehicle having a steering column 2 and a steering actuator 3. The steering column 2 comprises a steering shaft 4, which at one end bears a steering wheel 5 and which, for the most part, is arranged in a steering column housing 6, in which a shaft encoder (not shown) for the electronic activation of the electric steering actuator 3 is accommodated.

In addition, in the steering column housing 6 a so-called manual torque actuator 61 is accommodated, which gives the driver feedback on the driving situation in the form of a torque applied to the steering shaft 4. Via a connecting cable 7, the steering column 2 is connected to the steering actuator 3. This comprises a steering actuator housing 8 having a steering motor 9, which drives a pinion 10 that, for its part, is in engagement with a rack 11 acting on two tie rods 12, with which the vehicle wheels 13 can be pivoted. In the steering actuator housing 8 a torque transducer is accommodated, which measures the torque necessary for the pivoting of the vehicle wheels 13 and relays it, as feedback for the driver, to the steering column 2. The steering actuator 3 can alternatively also be configured as a so-called single-wheel steering system, in which the vehicle wheels 13 can be pivoted independently of one another.

Figure 2:
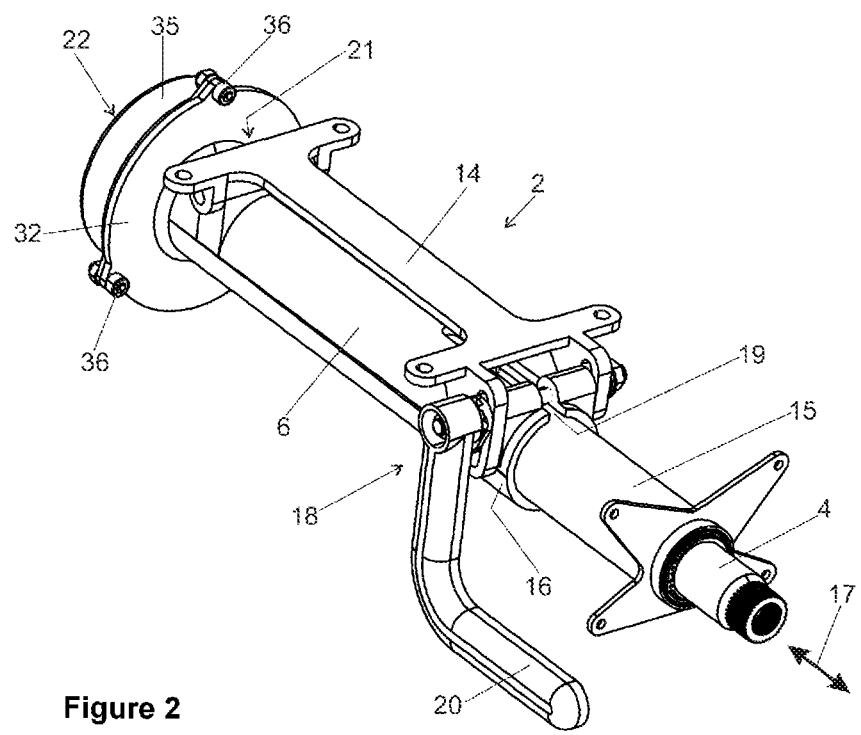
FIG. 2 is a perspective view of a steering column with rotation limiter.
Figure 3:
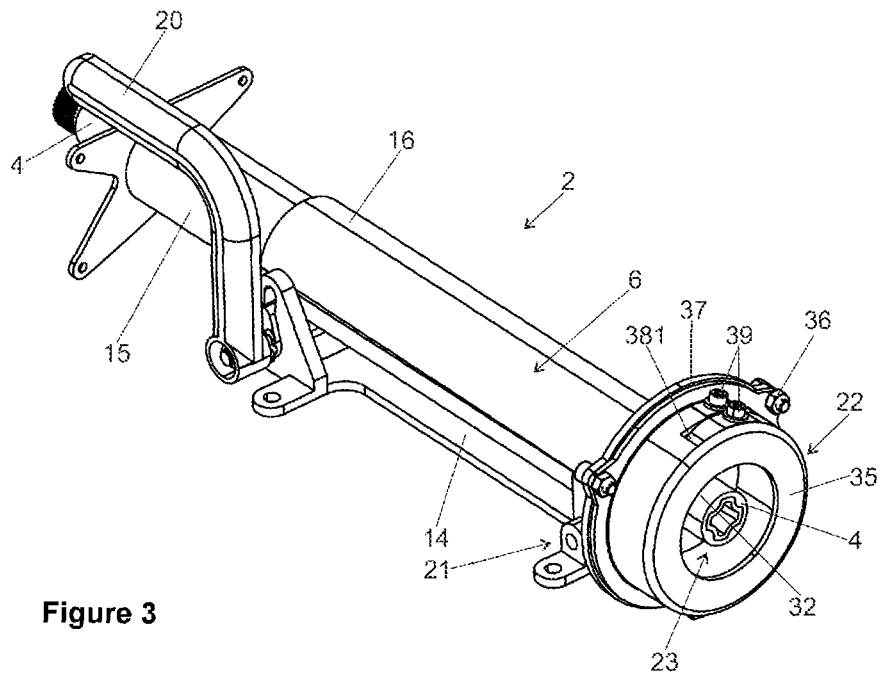
FIG. 3 is a perspective view of the steering column of FIG. 2, viewed from the opposite direction.
Figure 4:
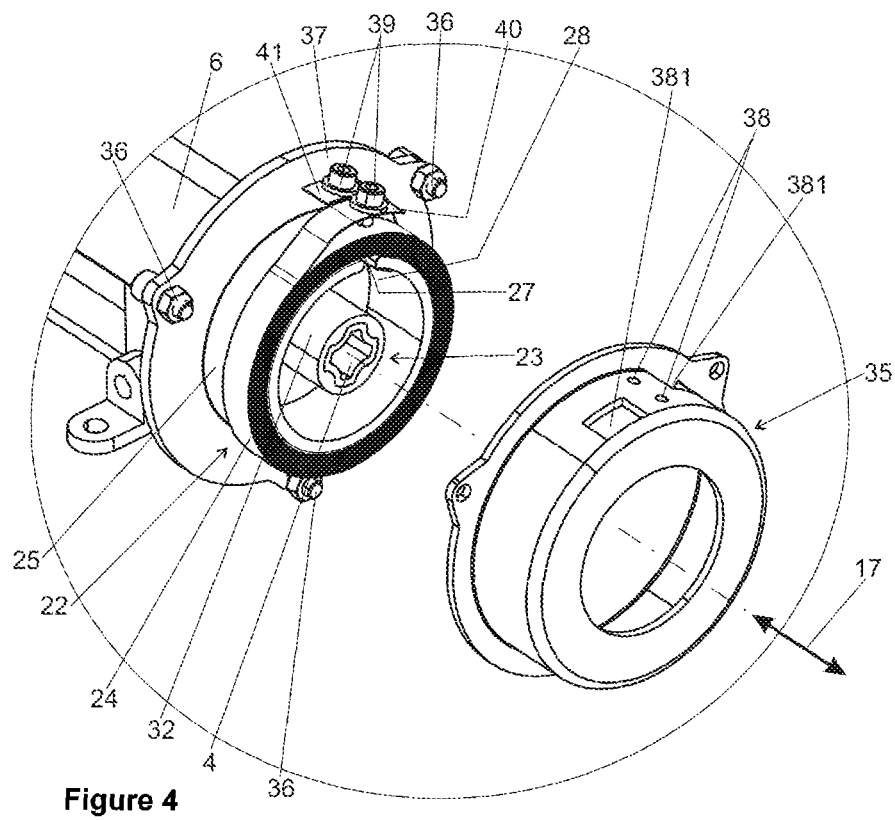
FIG. 4 is an enlarged detailed view from FIG. 3 with removed cap part.

FIG. 2 shows a substantial part of the steering column 2 having the steering column housing 6, in which the steering shaft 4 is rotatably mounted. The steering column housing 6 is held pivotably on a supporting unit 14, wherein the supporting unit 14 is connectable to a vehicle. The steering column 2 comprises an inner casing part 15, in which the steering shaft 4 is rotatably mounted, wherein the inner casing part 15 is housed in an outer casing part 16 and can be displaced in relation to this in the direction of the longitudinal axis, also referred to as the axial direction 17. For the fixing of the inner casing part 15 in relation to the outer casing part 16 there is provided a clamping device 18, which clamps together the outer casing part 16 provided with a slot 19, so that the inner casing part 15 is clamped in place in the outer casing part 16. For the tightening and loosening of the clamping device 18, an operating lever 20 is provided. The steering column housing 6 comprises in this illustrative embodiment the outer casing part 16 and the inner casing part 15. However, it can be provided that the steering column housing 6 is formed only of a single casing part, for instance, if a non-adjustable steering column or merely height-adjustable steering column is realized. The steering column housing 6 is defined by the fact that it directly or indirectly bears, or rotatably supports, the steering shaft.

The steering column housing 6 has an end portion 21, facing away from the steering wheel 5, in which the rotation limiter 22 according to the invention is accommodated.

Figure 5:
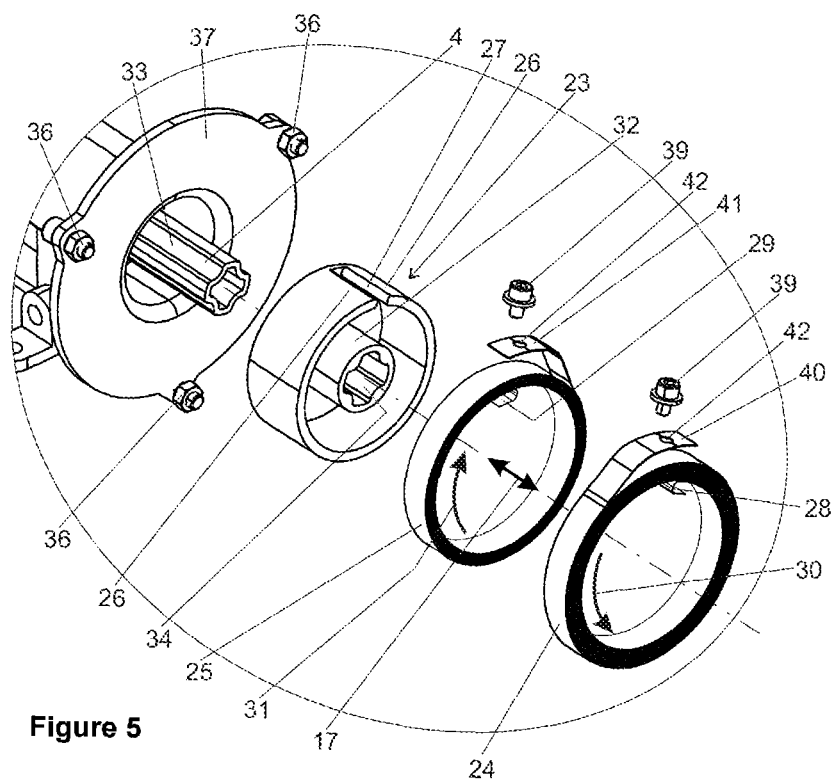
FIG. 5 is an exploded view of the rotation limiter.
Figure 6:
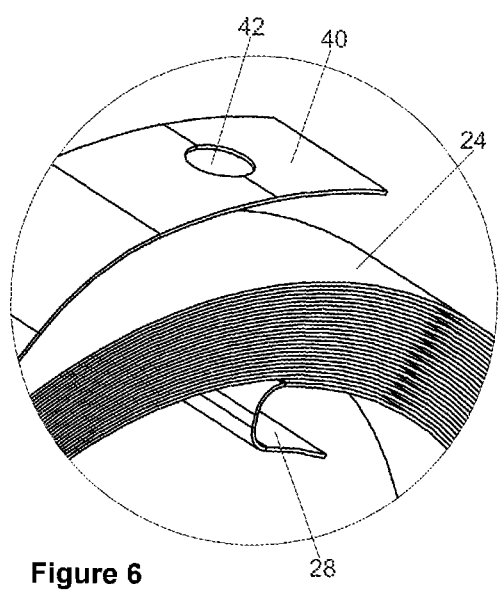
FIG. 6 is an enlarged detailed view from FIG. 5.
Figure 7:
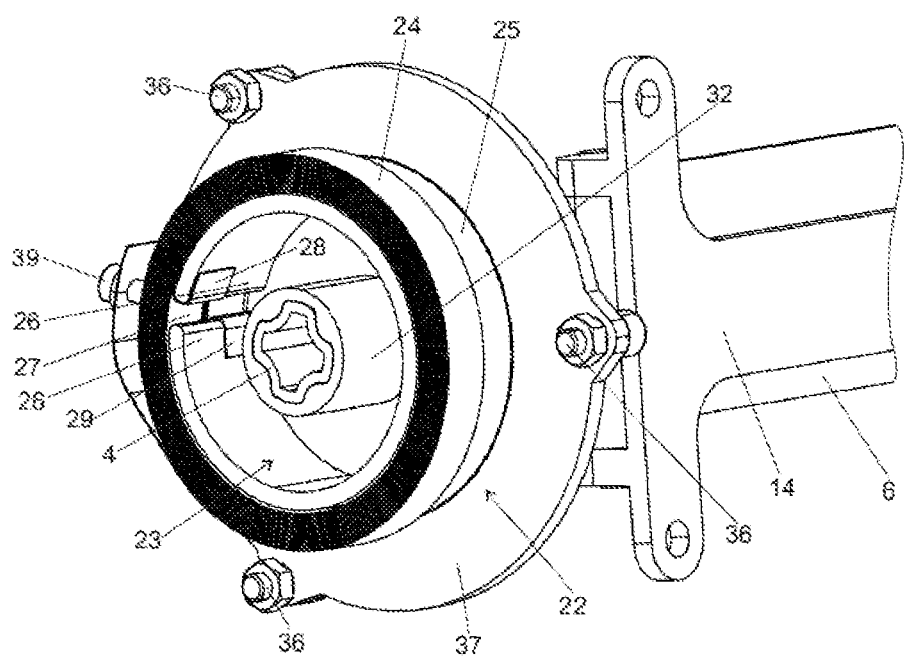
FIG. 7 is a perspective view of the rotation limiter from a different direction.

The rotation limiter 22 consists of a coupling part 23, on which two oppositely directed flat spiral springs 24, 25 are arranged side by side in the axial direction 17. The coupling part 23 has a cylindrical coupling portion 26, which is arranged radially on the outside and is coaxial with the steering shaft 4 and onto which the oppositely directed flat spiral springs 24, 25 are slipped in the axial direction 17. The coupling portion 26 is provided with a slot-shaped aperture 27, which is oriented in the axial direction 17. The flat spiral springs 24, 25 have respectively a bent-over inner end 28, 29. The inner ends 28, 29 engage in the aperture 27 and lock the respective flat spiral spring 24, 25 in its respective direction of rotation 30, 31. In FIG. 5, the direction of rotation 30 relates to the rotation of the inner end 28 of the flat spiral spring 24. The direction of rotation 31 relates to the rotation of the inner end 29 of the flat spiral spring 25.

The coupling part 23 further possesses a sleeve-shaped shaft portion 32, which, on its inner side facing the steering shaft 4, comprises a profile 34, which is configured to be complementary to the profile 33 of the outer side of the steering shaft 4. As a result, the shaft portion 32 is coupled in a torque-locking manner to the steering shaft 4 once it has been slipped onto the steering shaft 4 in the axial direction 17. Torques can therefore be transmitted between the steering shaft 4 and the shaft portion 32.

The rotation limiter 22 further comprises a cap part 35, which is fastened by means of three housing screws 36 to a mounting flange 37. The mounting flange 37 is arranged in the end portion 21, facing the vehicle front, of the steering column 2 or of the steering column housing 6.

The cap part 35 is provided with two screw holes 38, which are provided for the passage of two fastening screws 39. The fastening screws 39 serve to fasten the outer ends 40, 41 of the two flat spiral springs 24, 25 to the cap part 35. For this, the outer ends 40, 41 are respectively provided with a screw hole 42. In this way, the outer ends 40, 41 of the flat spiral springs 24, 25 are connected fixedly to the cap part 35, and this, in turn, is connected via the housing screws 36 fixedly to the mounting flange 37 of the steering column housing 6. They therefore remain stationary when the steering shaft rotates together with the inner ends 28, 29 of the flat spiral springs 24, 25. The first flat spiral spring 24 extends with its outer end 40 outward through an opening 381 in the lid 35. The second flat spiral spring 25, which is arranged in the opposite direction to the first flat spiral spring 24, extends with its outer end 41 outward through a further opening 381 in the lid 35.

If the driver turns the steering shaft 4 in a first direction of rotation 30, then the coupling part 23 arranged on the steering shaft 4 is also rotated. It hereupon takes with it the inner end 28, anchored in the aperture 27, of the first flat spiral spring 24, and winds this onto the coupling portion 26 up to the point at which the available spring length is used up. The coils of the flat spiral spring 24 now lie closely one above another, so that the spring becomes solidly compressed. A high torque of more than 250 Nm is thereby generated, which torque is directed counter to the first direction of rotation 30 and stops or blocks a further rotation of the steering shaft 4 in the first direction of rotation 30. A steering turning angle of around 540° can here be reached before the rotation limiter 22 becomes active through the solid compression of the first flat spiral spring 24. Conversely, a rotation of the steering shaft 4 in the second direction of rotation 31 opposite to the first direction of rotation 30 causes the inner end 29, anchored in the aperture 27 of the coupling portion 26, of the second flat spiral spring 25 to be transported in the second direction of rotation 31, and causes the flat spiral spring 25 to be wound onto the coupling portion 26 until all coils of the second flat spiral spring 25 lie close together and the second flat spiral spring 25 becomes solidly compressed. A high torque is hereupon generated counter to the second direction of rotation 31, which torque stops and blocks the rotation of the steering shaft 4 in the second direction of rotation 31. In this second direction of rotation 31 also, a maximum angle of rotation of 540° is provided before the rotation limiter 22 limits the further rotation through the solid compression of the second flat spiral spring 25.

The rotation limiter 22 according to the invention is distinguished by simple construction and a smooth, quiet running.

REFERENCE SYMBOL LIST 1 steer-by-wire steering system
2 steering column
3 steering actuator
4 steering shaft
5 steering wheel
6 steering column housing
7 connecting cable
8 steering actuator housing
9 steering motor
10 pinion
11 rack
12 tie rod
13 vehicle wheel
14 supporting unit
15 inner casing part
16 outer casing part
17 axial direction/longitudinal axis
18 clamping device
19 slot
20 operating lever
21 end portion
22 rotation limiter
23 coupling part
24 flat spiral spring
25 flat spiral spring
26 coupling portion
27 aperture
28 inner end
29 inner end
30 direction of rotation
31 direction of rotation
32 shaft portion
33 profile
34 profile
35 cap part
36 housing screws
37 mounting flange
38 screw holes
39 fastening screws
40 outer end
41 outer end
42 screw hole

What is claimed is:

1. A steering column for a motor vehicle, comprising:
    a steering column housing;
    a steering shaft mounted rotatably about a longitudinal axis in the steering column housing; and
    a rotation limiter comprising
        a coupling part that includes a coupling portion and a shaft portion that is disposed radially inwards of and radially spaced apart from the coupling portion such that a void exists radially between the coupling portion and the shaft portion, wherein the shaft portion of the coupling part is disposed in a rotationally secure manner on the steering shaft, and
        two oppositely directed flat spiral springs operatively arranged between the coupling portion of the coupling part and the steering column housing.

2. The steering column of claim 1, wherein the coupling portion is coaxial with the steering shaft, wherein the two oppositely directed flat spiral springs are arranged side by side in an axial direction on the coupling portion, wherein an inner end of each of the flat spiral springs is fastened to the coupling portion.

3. The steering column of claim 2, wherein the coupling portion is provided with a slot-shaped aperture, in which respectively a bent-over inner end of each of the flat spiral springs engages.

4. The steering column of claim 1, wherein the shaft portion of the coupling part is configured to slip axially onto the steering shaft and which, on its inner side thereof facing the steering shaft, comprises a profile that is complementary to an outer profile of the steering shaft.

5. The steering column of claim 1, wherein the rotation limiter is disposed at a longitudinal end of the steering column that is configured to be nearest a front of a vehicle and configured to be distal a steering wheel.

6. The steering column of claim 1, wherein outer ends of the flat spiral springs are fastened to a cap part that is rotationally-fixedly connected to the steering column housing, wherein at a longitudinal end of the cap part a surface of the cap part extends radially inwards from the coupling portion.

7. The steering column of claim 6, wherein the outer ends of the flat spiral springs are fastened to the cap part by fastening screws.

8. The steering column of claim 1, wherein the flat spiral springs are dimensioned in terms of their length such that they respectively allow a steering wheel turning angle within the range between 360° and 720° to the right and left.

9. The steering column of claim 1, wherein, at least in some sections thereof, the flat spiral springs exhibit a linear spring characteristic.

10. A steering column comprising:
a steering shaft mounted rotatably about a longitudinal axis; and
a rotation limiter comprising a coupling part disposed in a rotationally secure manner on the steering shaft and two oppositely directed flat spiral springs disposed on the coupling part, wherein a first of the two oppositely directed flat spiral springs is seated on an exterior surface of the coupling part, wherein an inner end of the first of the two oppositely directed flat spiral springs extends completely through an aperture in the exterior surface and radially into an interior of the coupling part.

11. The steering column of claim 10 wherein an inner end of a second of the two oppositely directed flat spiral springs extends completely through the aperture in the exterior surface and radially into the interior of the coupling part.

12. The steering column of claim 11 comprising a cap part that is disposed about the coupling part and is rotationally fixed to or with a steering column housing, wherein an outer end of the first of the two oppositely directed flat spiral springs extends radially and completely through a first opening in the cap part and is attached with a first fastener to an exterior surface of the cap part, wherein an outer end of the second of the two oppositely directed flat spiral springs extends radially and completely through a second opening in the cap part and is attached with a second fastener to the exterior surface of the cap part.

13. The steering column of claim 10 comprising a cap part that is disposed about the coupling part and is rotationally fixed to or with a steering column housing, wherein an outer end of the first of the two oppositely directed flat spiral springs extends radially and completely through an opening in the cap part and is attached with a fastener to an exterior surface of the cap part.

14. The steering column of claim 10 wherein the inner end of the first of the two oppositely directed flat spiral springs is bent about the aperture in the exterior surface of the coupling part.

15. The steering column of claim 10 wherein to limit rotation of the steering shaft the first of the two oppositely directed flat spiral springs is configured such that winding the first of the two oppositely directed flat spiral springs causes coils of the first of the two oppositely directed flat spiral springs to lie tightly against one another.

16. A steering column comprising:
a steering shaft mounted rotatably about a longitudinal axis;
a rotation limiter comprising a coupling part disposed in a rotationally secure manner on the steering shaft and two oppositely directed flat spiral springs disposed on the coupling part; and
a cap part that at least partially surrounds the coupling part, wherein outer ends of the two oppositely directed flat spiral springs are fastened to the cap part by fastening screws, with the fastening screws being disposed at a same circumferential location along an exterior of the cap part.

17. The steering column of claim 16 wherein a first of the two oppositely directed flat spiral springs extends radially through a first opening in the exterior of the cap part, wherein a second of the two oppositely directed flat spiral springs extends radially through a second opening in the exterior of the cap part, with the first and second openings being circumferentially spaced apart along the exterior of the cap part.

18. The steering column of claim 16 wherein at a longitudinal end of the cap part a surface of the cap part extends radially inwards from a coupling portion of the coupling part on which the two oppositely directed flat spiral springs are supported.

19. The steering column of claim 16 wherein the coupling part comprises a coupling portion on which the two oppositely directed flat spiral springs are supported, wherein the coupling portion includes a slot-shaped through-hole through which bent-over inner ends of the two oppositely directed flat spiral springs extend.

20. The steering column of claim 16 wherein the coupling part includes a coupling portion and a shaft portion that is disposed radially inwards of and radially spaced apart from the coupling portion such that a void exists radially between the coupling portion and the shaft portion, wherein the shaft portion of the coupling part is disposed in a rotationally secure manner on the steering shaft, wherein the two oppositely directed flat spiral springs are supported on the coupling portion.

* * * * *